VAN VECHTON RIESBERG.
VALVE FOR HEATING RADIATORS.
APPLICATION FILED MAR. 1, 1920.
1,384,486.
Patented July 12, 1921.
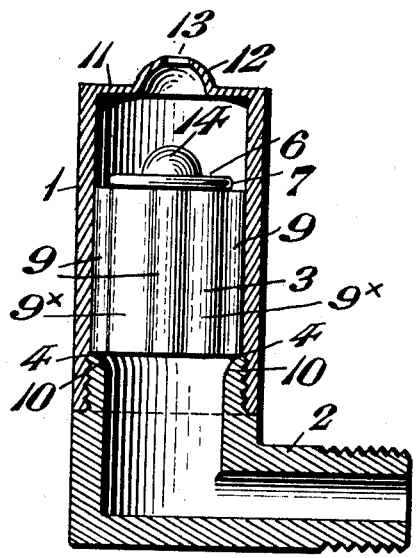
Fig. 1.
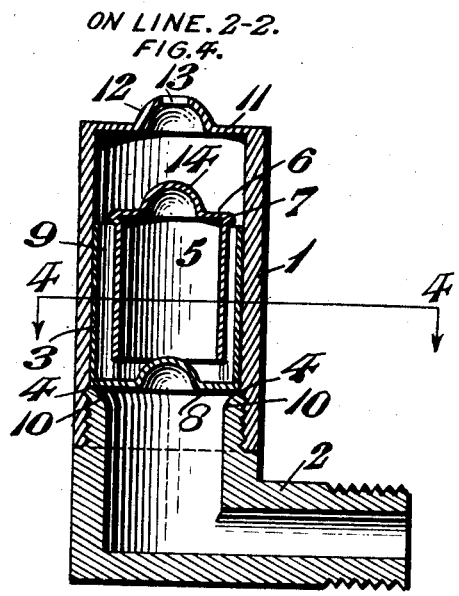
Fig. 2.
ON LINE. 2-2.
FIG. 4.
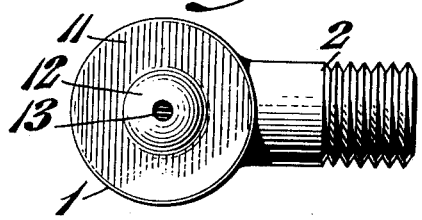
Fig. 3.
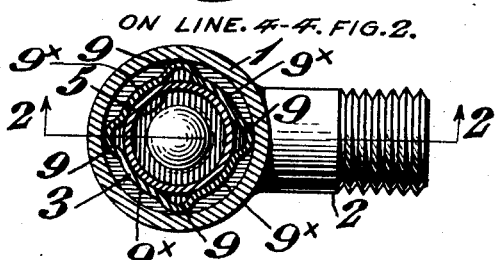
Fig. 4.
ON LINE. 4-4. FIG. 2.
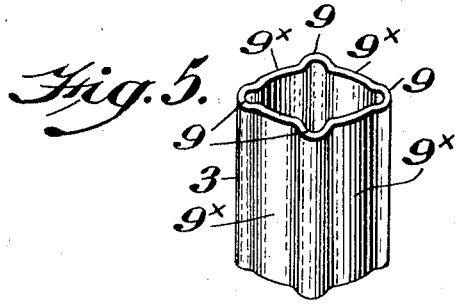
Fig. 5.
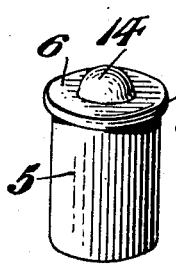
Fig. 6.
INVENTOR:
Van Vechton Riesberg.
BY
Wiedersheim & Fairbanks
ATTORNEYS.

UNITED STATES PATENT OFFICE.

VAN VECHTON RIESBERG, OF PHILADELPHIA, PENNSYLVANIA.

VALVE FOR HEATING-RADIATORS.

1,384,486.  Specification of Letters Patent.  Patented July 12, 1921.

Application filed March 1, 1920. Serial No. 362,229.

*To all whom it may concern:*

Be it known that I, VAN VECHTON RIESBERG, a citizen of the United States, residing in the city and county of Philadelphia, State of Pennsylvania, have invented a new and useful Valve for Heating-Radiators, of which the following is a specification.

My invention consists of a valve for heating radiators in which provision is made for the escape of air therefrom and for trapping water and steam, and preventing the escape of the latter into the apartment in which the radiator is placed.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a partial vertical section and partial side elevation of a radiator valve embodying my invention.

Fig. 2 represents a vertical section thereof on line 2—2 Fig. 4.

Fig. 3 represents a top or plan view thereof.

Fig. 4 represents a horizontal section on line 4—4 Fig. 2.

Fig. 5 represents a perspective view of the casing of the float member of the device.

Fig. 6 represents a perspective view of said float member.

Similar numerals of reference indicate corresponding parts in the figures.

Referring to the drawings, 1 designates the shell or exterior casing of the device, the same having connected with it the nipple 2 which extends therefrom and is adapted to be connected with the wall of a radiator and communicate with the interior of said casing or shell.

3 designates a vertically movable cup in the casing 1, the same being closed at the bottom and open at the top and has said bottom rested on the shoulder 4 on the inner wall of the casing 1, thus freely supporting said cup 3.

In the cup 3 is the float valve 5 which consists of an inverted hollow body closed at the top and open at the bottom and freely occupies said cup 3 telescopically.

On the top 6 of said float valve is the circumferential rim 7 which rests freely on the upper edge of the cup 3 and serves to retain the float valve spaced above the bottom 8 of said cup 3.

On the side wall of said cup are outturned corrugations at intervals the interiors of which form vertical channels 9 which are open throughout, said corrugations projecting toward the interior wall of the casing 1 leaving on the exterior of the cup 3 between said corrugations the passage ways $9^x$, said corrugations serving also to guide the cup true in its ascending and descending motions.

The channels 9 form a communication between the upper and lower portions of the cup 3. The passages $9^x$ form communication between the upper and lower portions of the casing 1, it being noticed that the shoulder 4 is somewhat beveled or chamfered as at 10 to allow the lower ends of said channels 9 to be in communication with the portion of the casing 1 below said cup 3.

On the top 11 of the casing 1 is the dome 12 in which is the exit port 13, and on the top 5 of the float valve is the dome 14 which is adapted on the full ascent of said float valve to enter the dome 12 and close the port 13, said dome 12 forming a seat for the float valve 5 through the medium of the dome 14 on the latter when said valve is raised to full extent, the several members of the device being in normal position as shown in Figs. 1 and 2.

The operation is as follows:—

Should there be air in the radiator, it will enter the casing, ascend the passageways $9^x$ and reach the port 13 by which it will escape into the apartment without objection.

Should water in the radiator enter the casing it may raise the cup and it will ascend the passages $9^x$ and reaching the top of the cup will descend the channels 9 and occupy said cup whereby the valve 5 will float and so cause the dome 14 to reach the dome 12 and close the port 13 preventing the water from escaping into the apartment.

Should steam in the radiator enter the casing if it is low pressure, it will have no appreciable action on the cup but it may ascend the passages $9^x$ and descend the channels 9 into the cup in which it will condense the condensed steam then evaporating.

Should the steam pressure be high, the upward force exerted thereby on the cup will carry said valve toward the dome 12 as its seat thus closing the port 13 in the latter and preventing the steam from escaping from the casing 1 and entering the apartment, the condensed steam that occupies the cup subsequently evaporating and so disappearing.

It will be seen that the device is of simple and inexpensive construction, and as the float valve and its containing cup are light in weight they are sensitive in their actions.

Having thus described my invention what I claim as new and desire to secure by Letters Patent, is:—

1. In a valve of the character stated, a casing, a cup vertically movable in said casing, an inverted float valve in said cup, and means on said cup whereby the latter is in communication with said casing, and said float valve is in communication with said cup, said cup being adapted to cause upward movement of the said valve by the upward force exerted on the cup.

2. In a valve of the character stated, a casing, a cup in said casing, and a hollow float valve telescopically in said cup, said cup having in its side a channel leaving between said side and that of said casing a passage, said passage being adapted to be in communication at its opposite ends with said casing, and said channel being adapted to be in communication with the interior of said float valve.

3. In a valve of the character stated, a casing, a cup in said casing adapted to rest freely therein, and a hollow float valve adapted to telescopically occupy said cup, said float valve having a portion on its side outturned forming a channel leaving a passage intermediate of said side and the adjacent wall of said casing, said passage having its opposite ends adapted to be in communication with said casing and said channel to be in communication with the interior of said float valve.

VAN VECHTON RIESBERG.

Witnesses:
JOHN A. WIEDERSHEIM,
N. BUSSINGER.